US008675273B2

(12) United States Patent
Yang et al.

(10) Patent No.: US 8,675,273 B2
(45) Date of Patent: Mar. 18, 2014

(54) SWITCHABLE TRANSPARENT ELECTROWETTING DISPLAY DEVICE

(75) Inventors: Syuan-Ling Yang, Hsin-Chu (TW); Ching-Huan Lin, Hsin-Chu (TW); Chu-Yu Liu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/366,272

(22) Filed: Feb. 4, 2012

(65) Prior Publication Data

US 2012/0320445 A1    Dec. 20, 2012

(30) Foreign Application Priority Data

Jun. 15, 2011 (TW) .............................. 100120907 A (51) Int. Cl.
*G02B 26/00* (2006.01)
(52) U.S. Cl.
USPC .......................................................... 359/290
(58) Field of Classification Search
USPC ................................................. 359/290, 299
See application file for complete search history.

(56) References Cited

U.S. PATENT DOCUMENTS

| | | | |
|---|---|---|---|
| 8,059,328 B1* | 11/2011 | Kuo et al. ..................... 359/290 |
| 2005/0151709 A1 | 7/2005 | Jacobson | |
| 2007/0019006 A1 | 1/2007 | Marcu | |
| 2009/0027317 A1 | 1/2009 | Cheng | |
| 2010/0033798 A1 | 2/2010 | Wang | |
| 2011/0181952 A1* | 7/2011 | Kim et al. ................ 359/485.01 |

FOREIGN PATENT DOCUMENTS

| | | |
|---|---|---|
| CN | 1864191 A | 11/2006 |
| CN | 101355836 A | 1/2009 |
| CN | 101968566 A | 2/2011 |
| TW | 201007321 | 2/2010 |

* cited by examiner

*Primary Examiner* — Scott J Sugarman
*Assistant Examiner* — Mustak Choudhury
(74) *Attorney, Agent, or Firm* — Winston Hsu; Scott Margo (57) ABSTRACT

An electrowetting display device includes an electrowetting display panel and an illumination unit. The electrowetting display panel includes two or more different optical color-converting liquid layers and a plurality of light-shielding liquid layers. The two or more different optical color-converting liquid layers are able to convert the light source generated by the illumination unit into light beams having two or more different colors of desired grey scales. The light-shielding liquid layers can be driven to change the transmittance of display regions so as to implement switch between transparent display mode, non-transparent display mode and semi-transparent display mode.

26 Claims, 9 Drawing Sheets

SWITCHABLE TRANSPARENT ELECTROWETTING DISPLAY DEVICE

BACKGROUND OF THE INVENTION

1. Field of the Invention

The present invention relates to a switchable transparent electrowetting display device, and more particularly, to a switchable transparent electrowetting display device in which the transparency and the grey scale value of different sub-pixel regions can be controlled independently.

2. Description of the Prior Art

Figure 1:
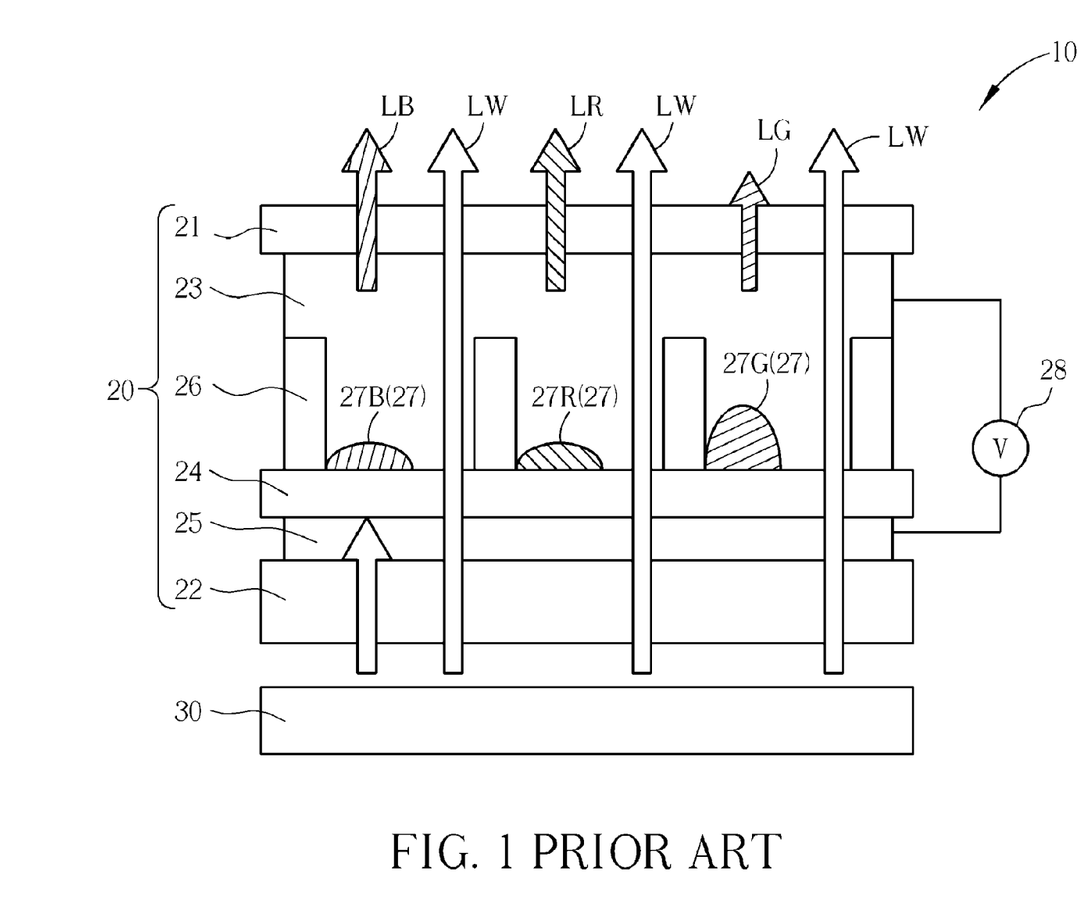
FIG. 1 is a schematic diagram illustrating a conventional electrowetting display device.

Electrowetting display device has been expected to be a potential product in display industry for its high aperture ratio and it does not require polarizer sheet. Please refer to FIG. 1. FIG. 1 is a schematic diagram illustrating a conventional electrowetting display device. As shown in FIG. 1, the conventional electrowetting display device 10 includes an electrowetting display panel 20 and a back light module 30. The electrowetting display panel 20 includes two transparent substrates 21, 22 disposed oppositely, a polarized water solution 23 disposed between the transparent substrates 21, 22, a hydrophobic dielectric layer 24, a transparent electrode 25, partitions 26, and ink layers 27 having different colors e.g. red ink layer 27R, green ink layer 27G and blue ink layer 27B. When a voltage source 28 provides a voltage between the transparent electrode 25 and the polarized water solution 23, the surface tension between the hydrophobic dielectric layer 24 and the polarized water solution 23 is modulated such that the locations of the ink layers 27 can be controlled. Consequently, after a white light LW generated by the back light module 30 passes through the ink layers 27 of different colors, a red light LR, a green light LG and a blue light LB having different grey scale values can be provided to exhibit full-color display effect.

However, the conventional electrowetting display device 10 is not able to provide transparent display effect. Also, the contrast ratio of the conventional electrowetting display device 10 is poor since the user will see the white light LW that does not pass through the ink layers 27 when displaying. As a result, the dark image displayed by the electrowetting display device 10 is not black enough.

SUMMARY OF THE INVENTION

It is therefore one of the objectives of the present invention to provide a switchable transparent electrowetting display device to enable a switch between a transparent display mode and a non-transparent display mode.

A preferred embodiment of the present invention provides a switchable transparent electrowetting display device including an electrowetting display panel and a light-emitting unit. The electrowetting display panel includes a first transparent substrate, a second transparent substrate and a plurality of pixel units. The second transparent substrate is disposed oppositely to the first transparent substrate. Each of the pixel units includes a plurality of first electrodes, at least one second electrode, a liquid layer, a first optical color-converting liquid layer, a second optical color-converting liquid layer and a plurality of light-shielding liquid layers. The first electrodes are disposed on the first transparent substrate and corresponding to a first sub-pixel region and a second sub-pixel region. The at least one second electrode is disposed on the second transparent substrate and corresponding to the first sub-pixel region and the second sub-pixel region. The liquid layer is disposed between the first electrodes and the at least one second electrode. The first optical color-converting liquid layer is disposed on the first electrode and corresponding to the first sub-pixel region for providing a first color light in the first sub-pixel region. The second optical color-converting liquid layer is disposed on the first electrode and corresponding to the second sub-pixel region for providing a second color light in the second sub-pixel region. The light-shielding liquid layers are disposed between the at least one second electrode and the liquid layer, wherein each of the light-shielding liquid layers corresponds to the first sub-pixel region and the second sub-pixel region, respectively, for controlling transmittances of the first sub-pixel region and the second sub-pixel region, respectively. The light-emitting unit is for providing a light source to the electrowetting display panel.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to the skilled users in the technology of the present invention, preferred embodiments will be detailed as follows. The preferred embodiments of the present invention are illustrated in the accompanying drawings with numbered elements to elaborate the contents and effects to be achieved.

Figure 2:
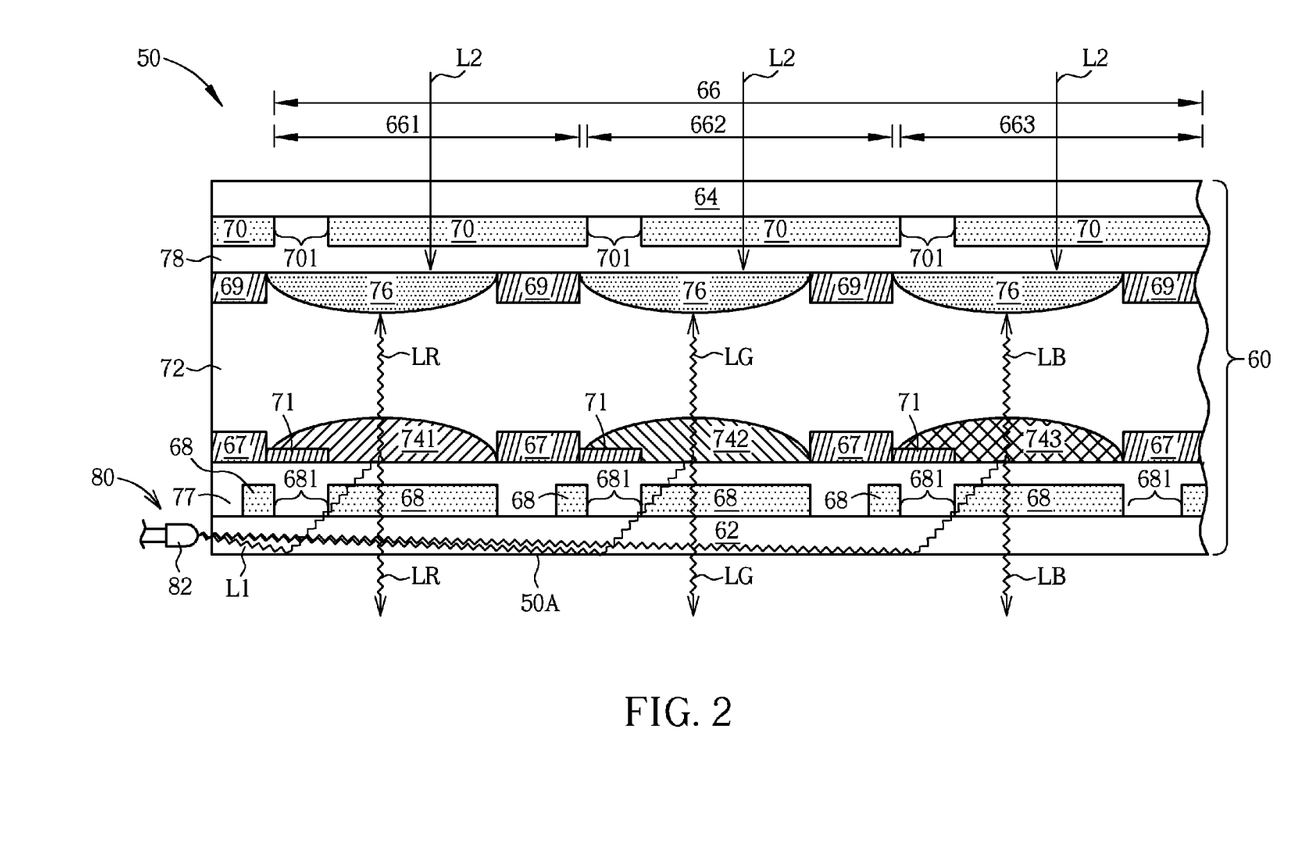
FIG. 2 is a schematic diagram illustrating a switchable transparent electrowetting display device according to a first preferred embodiment of the present invention.
Figure 3:
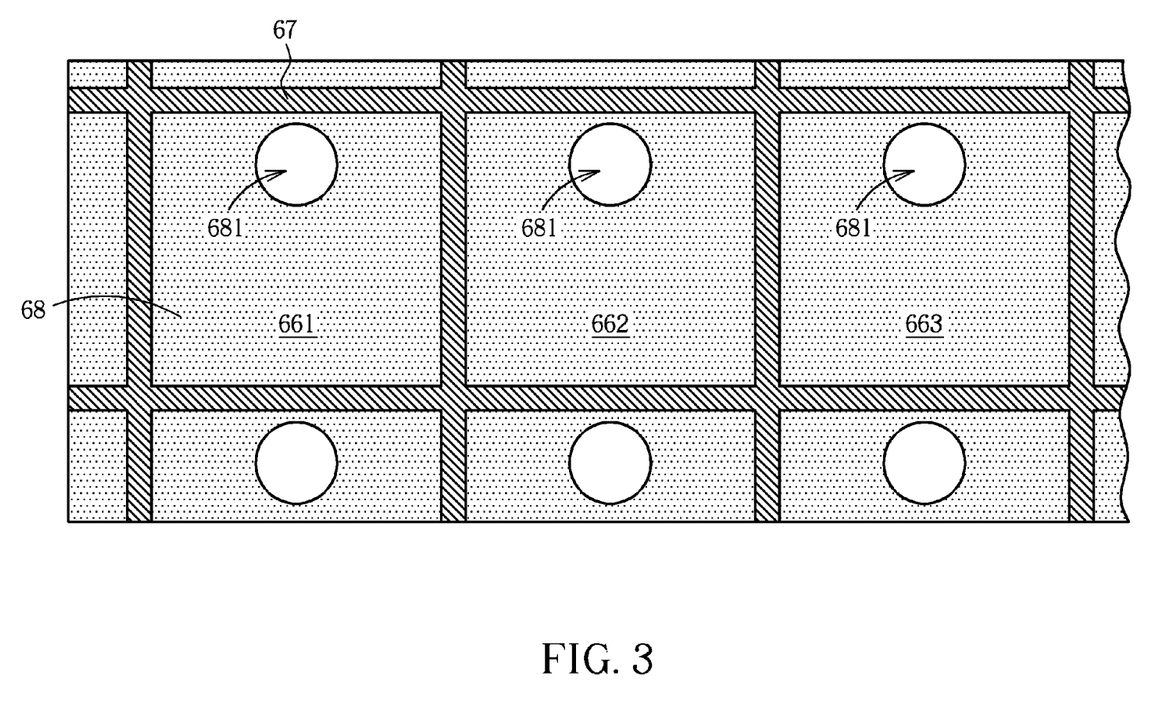
FIG. 3 partially illustrates the first electrodes and the first partitions of the switchable transparent electrowetting display device of FIG. 2.
Figure 4:
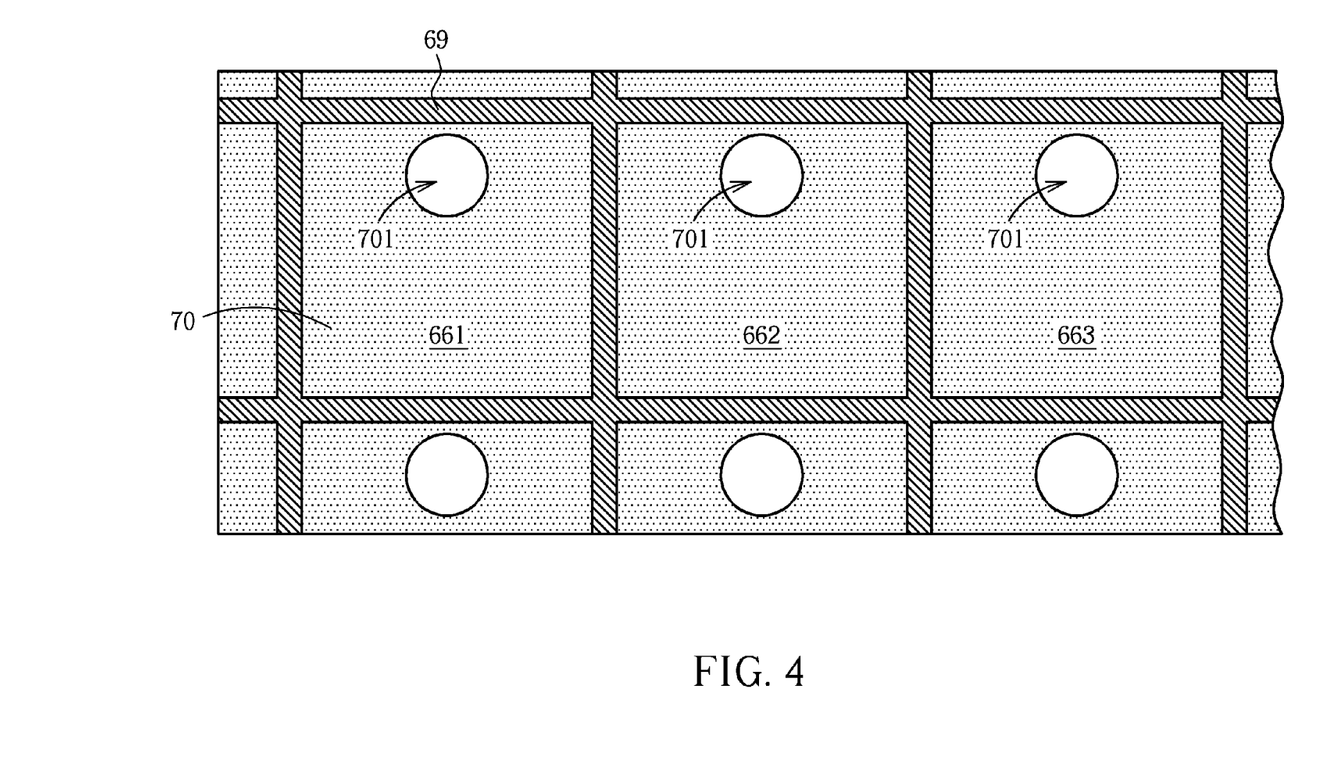
FIG. 4 partially illustrates the second electrodes and the second partitions of the switchable transparent electrowetting display device of FIG. 2.

Please refer to FIGS. 2-4. FIG. 2 is a schematic diagram illustrating a switchable transparent electrowetting display device according to a first preferred embodiment of the present invention; FIG. 3 partially illustrates the first electrodes and the first partitions of the switchable transparent electrowetting display device of FIG. 2; and FIG. 4 partially illustrates the second electrodes and the second partitions of the switchable transparent electrowetting display device of FIG. 2. As shown in FIG. 2, the switchable transparent electrowetting display device 50 of the present embodiment includes an electrowetting display panel 60 and a light-emitting unit 80. The electrowetting display panel 60 includes a first transparent substrate 62, a second transparent substrate 64 disposed oppositely to the first transparent substrate 62, and a plurality of pixel units 66. Each pixel unit 66 may include a first sub-pixel region 661, a second sub-pixel region 662 and a third sub-pixel region 663. Each pixel unit 66 further includes a plurality of first electrodes 68, at least one second electrode 70, a plurality of shielding patterns 71, a liquid layer 72, a first optical color-converting liquid layer 741, a second optical color-converting liquid layer 742, a third optical color-converting liquid layer 743 and a plurality of light-shielding liquid layers 76.

The first electrodes 68 are disposed on the first transparent substrate 62 and correspond to the first sub-pixel region 661, the second sub-pixel region 662 and the third sub-pixel region 663, respectively. The first electrodes 68 may include transparent electrodes e.g. indium tin oxide (ITO) electrodes, but not limited thereto. As shown in FIGS. 2-3, the electrowetting display panel 60 further includes a plurality of first partitions 67 disposed on the first transparent substrate 62, and each first partition 67 surrounds the first sub-pixel region 661, the second sub-pixel region 662 and the third sub-pixel region 663 for restraining the first optical color-converting liquid layer 741, the second optical color-converting liquid layer 742, the third optical color-converting liquid layer 743 in the first sub-pixel region 661, the second sub-pixel region 662 and the third sub-pixel region 663, respectively. Each first electrode 68 further has at least one first opening 681 corresponding to the first sub-pixel region 661, the second sub-pixel region 662 and the third sub-pixel region 663, respectively. The shape of the first opening 681 may be a closed pattern, e.g. a circular opening or other closed pattern. The shape of the first opening 681 may also be an open pattern e.g. an indention.

The second electrode 70 is disposed on the second transparent substrate 64 and corresponds to the first sub-pixel region 661, the second sub-pixel region 662 and the third sub-pixel region 663. The second electrode 70 may include at least one transparent electrode e.g. an indium tin oxide (ITO) electrode, but not limited thereto. In this embodiment, the second electrode 70 corresponding to the first sub-pixel region 661, the second sub-pixel region 662 and the third sub-pixel region 663 is the same one transparent electrode, which means the second electrode 70 may be driven by the same driving signal, but not limited thereto. For example, the electrowetting display panel 60 may include a plurality of second electrodes 70 electrically disconnected from one another and corresponding to the first sub-pixel region 661, the second sub-pixel region 662 and the third sub-pixel region 663, respectively. The second electrodes 70 may be driven by one driving signal or a plurality of driving signals. As shown in FIG. 2 and FIG. 4, the electrowetting display panel 60 may further include a plurality of second partitions 69 disposed on the second transparent substrate 64, and each second partition 69 surrounds the first sub-pixel region 661, the second sub-pixel region 662 and the third sub-pixel region 663 for restraining each of light-shielding liquid layer 76 in the first sub-pixel region 661, the second sub-pixel region 662 and the third sub-pixel region 663, respectively. The second electrode 70 further has a plurality of second openings 701 corresponding to the first sub-pixel region 661, the second sub-pixel region 662 and the third sub-pixel region 663, respectively. The shape of the second opening 701 may be a closed pattern, e.g. a circular opening or other closed pattern. The shape of the second opening 701 may also be an open pattern e.g. an indention. The second openings 701 of the second electrode 70 can partially or identically correspond to the first opening 681 of the first electrode 68, but not limited thereto.

The shielding patterns 71 are disposed on the first transparent substrate 62 and correspond to the first openings 681 of the first electrodes 68, respectively. The shielding patterns 71 could be made of metal, such as Al or Cr, light-absorbing material or light-shielding material, and also be non-hydrophilic material. The liquid layer 72 is disposed between the first electrodes 68 and the second electrode 70, and the liquid layer 72 is preferably a hydrophilic liquid layer with polarity, for instance a polarized water solution, but not limited thereto. The first optical color-converting liquid layer 741 is disposed on the first electrode 68 and corresponds to the first sub-pixel region 661 for providing a first color light e.g. a red light LR in the first sub-pixel region 661. The second optical color-converting liquid layer 742 is disposed on the first electrode 68 and corresponds to the second sub-pixel region 662 for providing a second color light e.g. a green light LG in the second sub-pixel region 662. The third optical color-converting liquid layer 743 is disposed on the first electrode 68 and corresponds to the third sub-pixel region 663 for providing a third color light e.g. a blue light LB in the third sub-pixel region 663. The first optical color-converting liquid layer 741, the second optical color-converting liquid layer 742 and the third optical color-converting liquid layer 743 are hydrophobic liquid layers without polarity, which are insoluble in the liquid layer 72. The light-shielding liquid layers 76 are disposed between the second electrode 70 and the liquid layer 72, and the light-shielding liquid layers 76 are corresponding to the first sub-pixel region 661, the second sub-pixel region 662 and the third sub-pixel region 663, respectively, for controlling the transmittance of the first sub-pixel region 661, the second sub-pixel region 662 and the third sub-pixel region 663. The light-shielding liquid layer 76 may be a hydrophobic liquid layer with light-shielding property such as black ink. In this embodiment, the electrowetting display panel 60 further includes a first hydrophobic dielectric layer 77 disposed on the first electrodes 68, and a second hydrophobic dielectric layer 78 disposed on the second electrode 70. In this embodiment, the first hydrophobic dielectric layer 77 and the second hydrophobic dielectric layer 78 may be formed by forming a hydrophobic film on a dielectric base material, for example by forming a Teflon film on a silicon oxide layer, but not limited thereto. In this embodiment, the first optical color-converting liquid layer 741, the second optical color-converting liquid layer 742 and the third optical color-converting liquid layer 743 are disposed between the first hydrophobic dielectric layer 77 and the liquid layer 72. The shielding patterns 71 are disposed between the first hydrophobic dielectric layer 77 and the first optical color-converting liquid layer 741, the second optical color-converting liquid layer 742 and the third optical color-converting liquid layer 743, respectively.

The light-emitting unit 80 is used to provide a light source L1 for the electrowetting display panel 60. In this embodiment, the first transparent substrate 62 is the display side 50A of the switchable transparent electrowetting display device 50. The light-emitting unit 80 includes at least one light-emitting device 82 disposed on at least one side of the first transparent substrate 62. For example, the light-emitting device 82 may be disposed on only one side of the first transparent substrate 62, disposed on two opposite sides of the first transparent substrate 62, disposed on three sides of the first transparent substrate 62 or disposed on all sides of the first transparent substrate 62. In this embodiment, the light-emitting device 82 can provide a near ultraviolet light source. For instance, the light-emitting device 82 may be a gallium nitride light-emitting diode (GaN LED) device, but not limited thereto. The wavelength of the near ultraviolet light source is substantially between 300 nm and 420 nm. In addition, the first transparent substrate 62 may be a light guide plate, which is able to direct the light source L1 toward the electrowetting display panel 60, but not limited thereto. For example, in other variant embodiments, the first transparent substrate 62 may not have light guiding effect.

In this embodiment, the first optical color-converting liquid layer 741, the second optical color-converting liquid layer 742 and the third optical color-converting liquid layer 743 are e.g. a red optical color-converting liquid layer, a green optical color-converting liquid layer and a blue optical color-converting liquid layer, respectively, for converting the light source L1 into a red light LR, a green light LG and a blue light LB, respectively. For example, the red optical color-converting liquid layer, the green optical color-converting liquid layer and the blue optical color-converting liquid layer may be a red fluorescent layer, a green fluorescent layer and a blue fluorescent layer, respectively. In such a case, the light source (near ultraviolet light source) L1, after irradiating on the red fluorescent layer, the green fluorescent layer and the blue fluorescent layer, will be excited to the red light LR, the green light LG and the blue light LB, respectively, toward all directions. Consequently, a full-color image may be generated after the red light LR, the green light LG and the blue light LB emitting toward the display side 50A are mixed. The red optical color-converting liquid layer, the green optical color-converting liquid layer and the blue optical color-converting liquid layer are not limited to be fluorescent layers, and may be, for instance, red colloidal quantum dots, green colloidal quantum dots and blue colloidal quantum dots, respectively. The first optical color-converting liquid layer 741, the second optical color-converting liquid layer 742 and the third optical color-converting liquid layer 743 are not limited to be a red optical color-converting liquid layer, a green optical color-converting liquid layer and a blue optical color-converting liquid layer, and can be optical color-converting liquid layers of other different colors that can convert the light source L1 into lights of different colors for forming a full-color image.

In this embodiment, the transparency and the grey scale value of each sub-pixel in the switchable transparent electrowetting display device 50 can be controlled individually. Each first electrode 68 may be driven actively, but not limited thereto. By adjusting the voltage difference between each first electrode 68 and the liquid layer 72 independently, the grey scale values of the first sub-pixel region 661, the second sub-pixel region 662 and the third sub-pixel region 663 can be modulated independently to provide a desired full-color image. Specifically, the first optical color-converting liquid layer 741, the second optical color-converting liquid layer 742, the third optical color-converting liquid layer 743 are able to convert the light source L1 into the red light LR, the green light LG and the blue light LB, respectively, and adjusting the voltage difference between each first electrode 68 and the liquid layer 72 may alter the surface energy in the interface between the liquid layer 72 and the first hydrophobic dielectric layer 77. Consequently, the locations of the first optical color-converting liquid layer 741, the second optical color-converting liquid layer 742 and the third optical color-converting liquid layer 743 can be controlled. As a result, the grey scale values of the first sub-pixel region 661, the second sub-pixel region 662 and the third sub-pixel region 663 can be precisely controlled. The second electrode 70 can be driven passively, but not limited thereto. The second electrode 70 is used to control the transparency of the switchable transparent electrowetting display device 50. Specifically, by adjusting the voltage difference between the second electrode 70 and the liquid layer 72, the surface energy in the interface between the liquid layer 72 and the second hydrophobic dielectric layer 78 can be altered. Consequently, the locations of the light-shielding liquid layers 76 can be controlled. As a result, the switchable transparent electrowetting display device 50 can provide transparent display mode, non-transparent display mode or a semi-transparent display mode of any desired grey scale value. Different operation modes of the switchable transparent electrowetting display device will be detailed in the following description.

Please refer to FIG. 2, again. FIG. 2 is a schematic diagram illustrating a switchable transparent electrowetting display device of the present embodiment in a non-transparent display mode. As shown in FIG. 2, in the non-transparent display mode, the second electrode 70 and liquid layer 72 have identical potential, and thus the light-shielding liquid layers 76 will distribute uniformly in the first sub-pixel region 661, the second sub-pixel region 662 and the third sub-pixel region 663. Consequently, an ambient light L2 is not able to pass, thereby exhibiting a non-transparent display effect.

Figure 5:
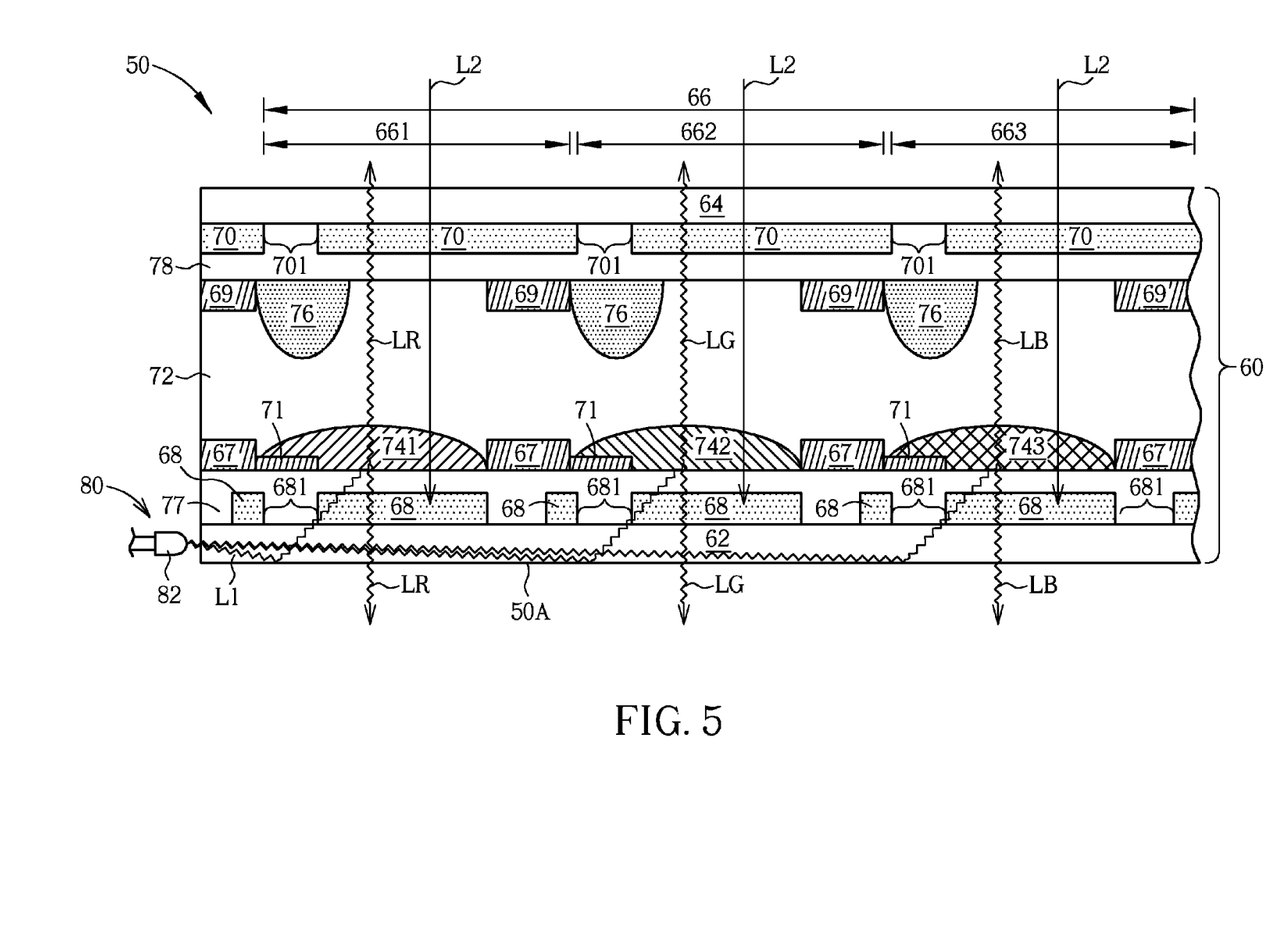
FIG. 5 is a schematic diagram illustrating a switchable transparent electrowetting display device of the present embodiment in a transparent display mode.

Please refer to FIG. 5. FIG. 5 is a schematic diagram illustrating a switchable transparent electrowetting display device of the present embodiment in a transparent display mode. As shown in FIG. 5, the second electrode 70 and the liquid layer 72 have a potential difference. For example, the liquid layer 72 is grounded, while a voltage is applied to the second electrode 70. The voltage difference between the second electrode 70 and the liquid layer 72 can drive the light-shielding liquid layer 76 to move toward the second opening 701 of the second electrode 70. Accordingly, when the voltage difference between the second electrode 70 and the liquid layer 72 reaches the threshold voltage, the light-shielding liquid layer 76 will gather to completely correspond to the second opening 701. In such a case, the ambient light L2 is able to pass through regions outside the second opening 701, thereby exhibiting a transparent display effect. It is to be appreciated that, as adjusting the voltage difference between the second electrode 70 and the liquid layer 72 from zero to the threshold voltage, the display mode of the switchable transparent electrowetting display device 50 is shifted from non-transparent to transparent. Thus, a semi-transparent display mode can be provided when the voltage difference between the second electrode 70 and the liquid layer 72 is set a value between zero and the threshold voltage.

Figure 6:
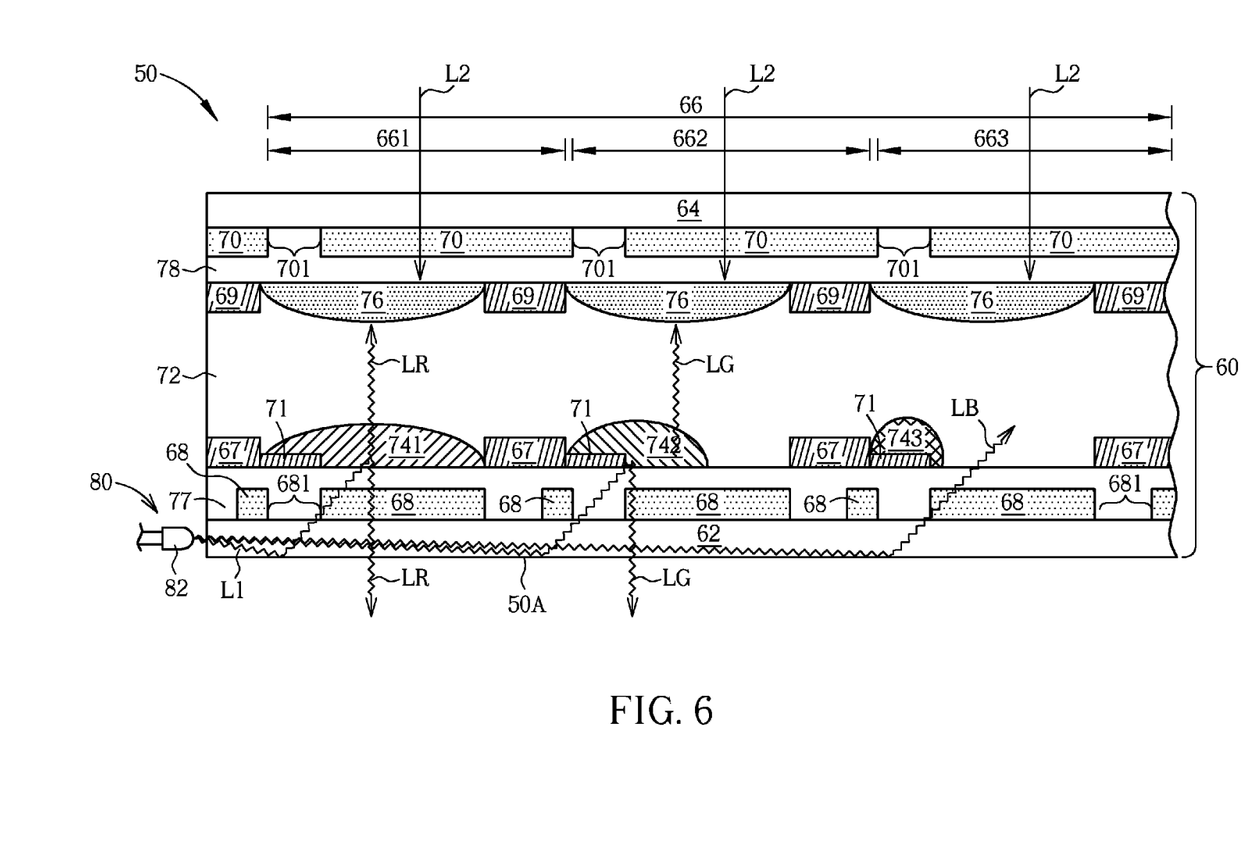
FIG. 6 is a schematic diagram illustrating a switchable transparent electrowetting display device of the present embodiment in a display mode.

Please refer to FIG. 6. FIG. 6 is a schematic diagram illustrating a switchable transparent electrowetting display device of the present embodiment in a display mode. As shown in FIG. 6, in the display mode, at least a portion of the first electrodes 68 and the liquid layer 72 have identical potential. For example, if the first sub-pixel region 661 is required to provide information with a high grey scale value, the second sub-pixel region 662 is required to provide information with a low grey scale value, and the third sub-pixel region 663 is required to provide information with zero grey scale value, the first sub-pixel region 661, the second sub-pixel region 662 and the third sub-pixel region 663 will be operated as follows. The first electrode 68 and the liquid layer 72 of the first sub-pixel region 661 is set to be equal potential, so the first optical color-converting liquid layer 741 will distribute uniformly in the first sub-pixel region 661. Meanwhile, the light source L1 will emit on the first optical color-converting liquid layer 741, exciting a red light LR with high grey scale value. The first electrode 68 and the liquid layer 72 of the second sub-pixel region 662 is set to have a low voltage difference, such as the liquid layer 72 is grounded and a low voltage is applied to the first electrode 68, so the second optical color-converting liquid layer 742 will partially distribute in the second sub-pixel region 662. Meanwhile, the light source L1 will emit on the second optical color-converting liquid layer 742, exciting a green light LG with low grey scale value. The first electrode 68 and the liquid layer 72 of the third sub-pixel region 663 is set to have a high voltage difference, such as the liquid layer 72 is grounded and a high voltage is applied to the first electrode 68, so the third optical color-converting liquid layer 743 will gather and correspond to the first opening 681 of the first electrode 68. Meanwhile, the third optical color-converting liquid layer 743 will be blocked by the shielding pattern 71, and therefore the light source L1 will not emit on the third optical color-converting liquid layer 743. Thus, no blue light will be excited. In the meantime, if the switchable transparent electrowetting display device 50 is in a non-transparent display mode, the third sub-pixel region 663 will exhibit a dark image; and if the switchable transparent electrowetting display device 50 is in a transparent display mode or a semi-transparent display mode, the third sub-pixel region 663 will be transparent or semi-transparent.

Figure 7:
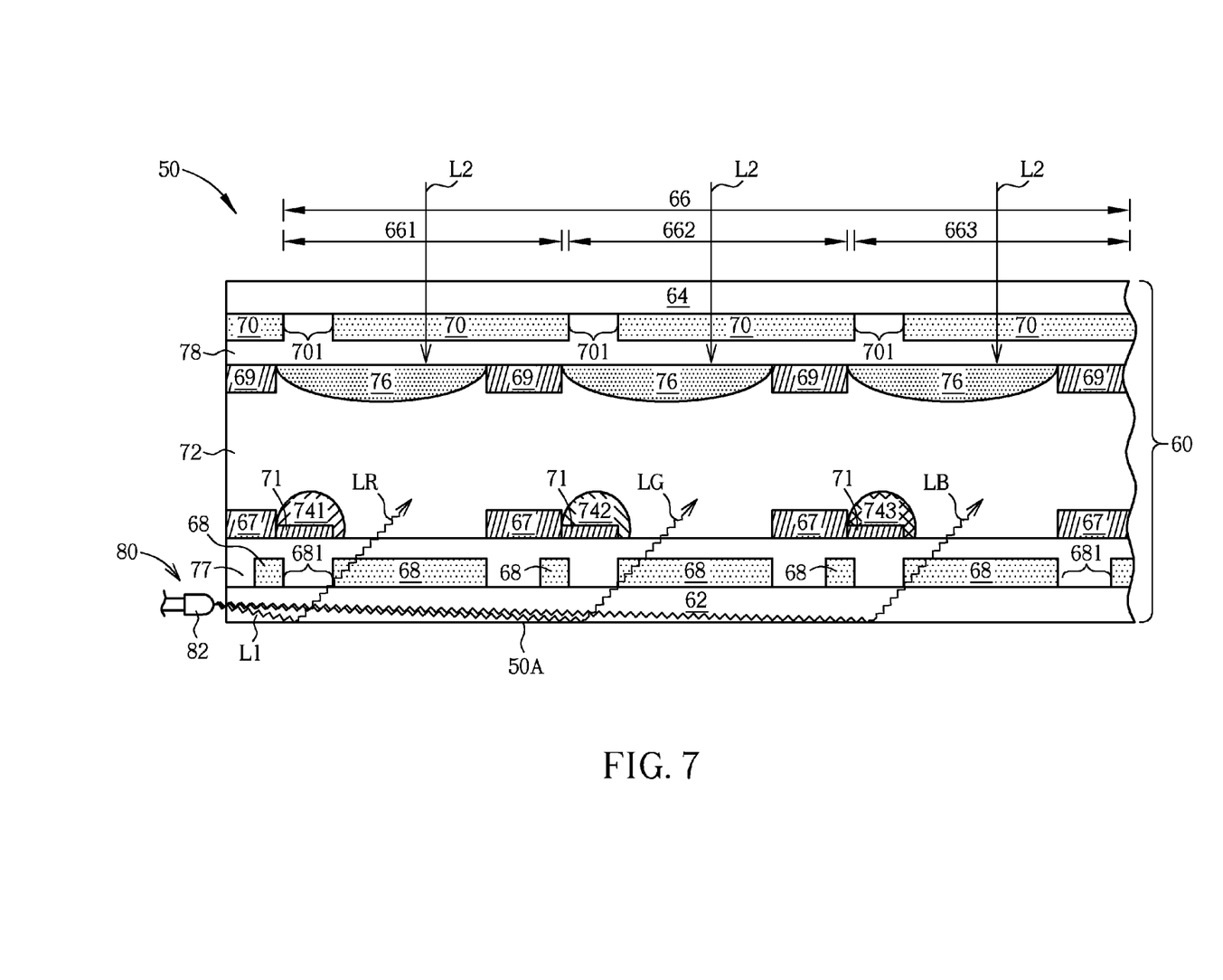
FIG. 7 is a schematic diagram illustrating a switchable transparent electrowetting display device of the present embodiment in a non-display mode.

Please refer to FIG. 7. FIG. 7 is a schematic diagram illustrating a switchable transparent electrowetting display device of the present embodiment in a non-display mode. As shown in FIG. 7, in the non-display mode, the first sub-pixel region 661, the second sub-pixel region 662 and the third sub-pixel region 663 are not required to provide grey scale value, i.e. all of the grey scale values are zero. In such a case, a high voltage difference is applied to the first electrode 68 and the liquid layer 72 in the first sub-pixel region 661, the second sub-pixel region 662 and the third sub-pixel region 663. For example, the liquid layer 72 is grounded, and a high voltage is applied to the first sub-pixel region 661, the second sub-pixel region 662 and the third sub-pixel region 663. Consequently, the first optical color-converting liquid layer 741, the second optical color-converting liquid layer 742 and the third optical color-converting liquid layer 743 will gather and correspond to the first opening 681 of the first electrode 68, respectively. Meanwhile, the first optical color-converting liquid layer 741, the second optical color-converting liquid layer 742 and the third optical color-converting liquid layer 743 will be blocked by corresponding shielding patterns 71, and therefore the light source L1 will not emit on the first optical color-converting liquid layer 741, the second optical color-converting liquid layer 742 and the third optical color-converting liquid layer 743. Thus, no red light, green light and blue light will be excited.

In this embodiment, the transparency and the grey scale value of each sub-pixel in the switchable transparent electrowetting display device 50 can be controlled individually. Operationally, one of the operation modes including transparent display mode, non-transparent display mode and semi-transparent display mode can be selected by adjusting the voltage difference between the second electrode 70 and the liquid layer 72. In addition, the grey scale value of the first sub-pixel region 661, the second sub-pixel region 662 and the third sub-pixel region 663 can be independently controlled to provide one of the operation modes including display mode and non-display mode. In other words, the user can select one of the operation modes including transparent display mode, non-transparent display mode and semi-transparent display mode, and also select one of the operation modes including display mode and non-display mode. For example, the switchable transparent electrowetting display device of the invention can be set in the transparent display mode and display mode as well, in the non-transparent display mode and the display mode as well, in the semi-transparent display mode and the display mode as well, in the transparent display mode and the non-display mode as well, the non-transparent display mode and the non-display mode as well, or the semi-transparent display mode and the non-display mode. In addition, in some particular applications, a dual side display effect can be carried out when the switchable transparent electrowetting display device is in the transparent display mode and the display mode as well, or in the semi-transparent display mode and the display mode as well. In addition, the light source of this embodiment is a near ultraviolet light source, which is invisible to human eyes, and thus no light leakage problem is arouse. Therefore, the contrast ratio is improved.

The switchable transparent electrowetting display device is not limited by the aforementioned embodiment, and may have other different preferred embodiments. To simplify the description, the identical components in each of the following embodiments are marked with identical symbols. For making it easier to compare the difference between the embodiments, the following description will detail the dissimilarities among different embodiments and the identical features will not be redundantly described.

Figure 8:
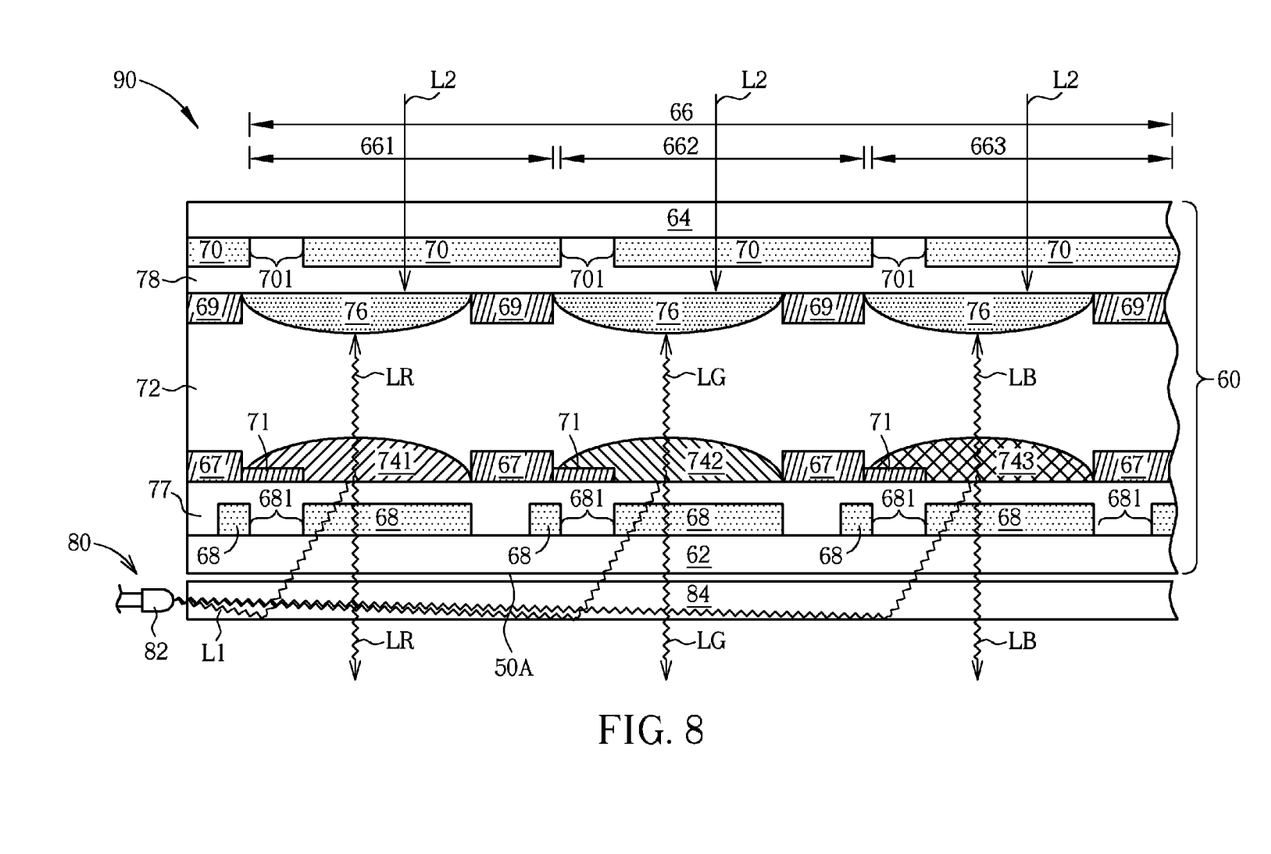
FIG. 8 is a schematic diagram illustrating a switchable transparent electrowetting display device according to a second preferred embodiment of the present invention.

Please refer to FIG. 8. FIG. 8 is a schematic diagram illustrating a switchable transparent electrowetting display device according to a second preferred embodiment of the present invention. Different from the first preferred embodiment, as shown in FIG. 8, the electrowetting display panel 60 of the switchable transparent electrowetting display device 90 of this embodiment does not have light guiding effect. In such a case, the switchable transparent electrowetting display device 90 further includes a light guide plate 84 disposed on the other side of the first transparent substrate 62 opposite to the second transparent substrate 64. The light-emitting device 82 is disposed on at least one side of the light guide plate 84, for directing the light source L1 toward the electrowetting display panel 60.

Figure 9:
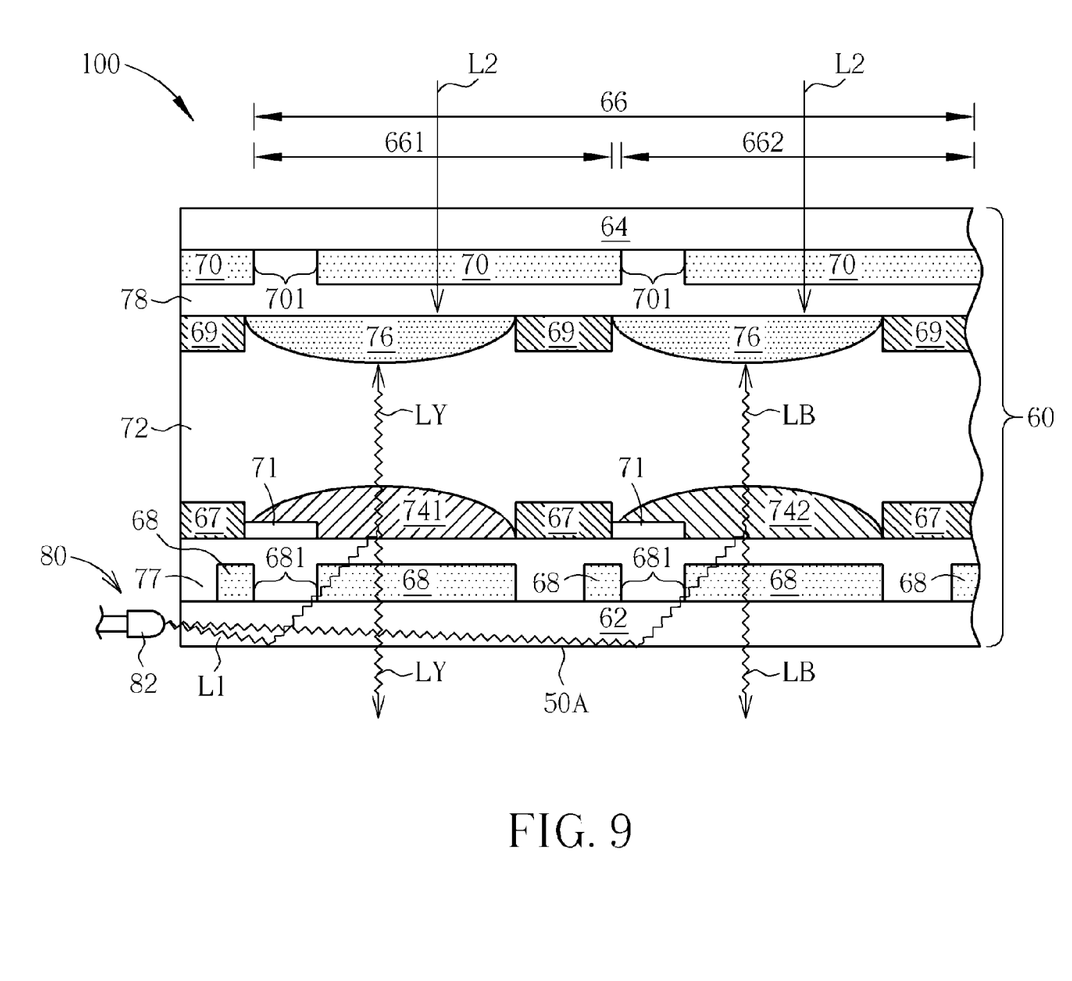
FIG. 9 is a schematic diagram illustrating a switchable transparent electrowetting display device according to a third preferred embodiment of the present invention.

Please refer to FIG. 9. FIG. 9 is a schematic diagram illustrating a switchable transparent electrowetting display device according to a third preferred embodiment of the present invention. Different from the aforementioned preferred embodiments, each pixel unit 66 of the switchable transparent electrowetting display device 100 of this embodiment includes only a first sub-pixel region 661 and a second sub-pixel region 662, but does not include a third sub-pixel region. In addition, the light-emitting unit 80 can provide a light source (e.g. near ultraviolet light source) L1, and the first optical color-converting liquid layer 741 and the second optical color-converting liquid layer 742 are for example a yellow optical color-converting liquid layer and a blue optical color-converting liquid layer, respectively, for converting the light source L1 into a yellow light LY and a blue light LB, respectively, but not limited thereto. The yellow optical color-converting liquid layer and the blue optical color-converting liquid layer may include a yellow fluorescent layer and a blue fluorescent layer, respectively; or the yellow optical color-converting liquid layer and the blue optical color-converting liquid layer may include yellow colloidal quantum dots and blue colloidal quantum dots, respectively. The configuration and the operation modes including the non-transparent display mode, the transparent display mode, the semi-transparent display mode, the display mode and the non-display mode of the switchable transparent electrowetting display device 100 have been detailed in the aforementioned embodiments, and are not redundantly described.

In conclusion, the switchable transparent electrowetting display device of the present invention can be switched between the transparent display mode and non-transparent mode, and thus the contrast ratio can be improved. The switchable transparent electrowetting display device of the present invention may include two different types of sub-pixel regions, three different types of sub-pixel regions, or more different types of sub-pixel regions to implement a full-color display device, or a semi-full color display device applicable in various applications or specifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switchable transparent electrowetting display device, comprising:
    an electrowetting display panel, comprising:
        a first transparent substrate, wherein the first transparent substrate is a display side of the switchable transparent electrowetting display device;
        a second transparent substrate, disposed oppositely to the first transparent substrate;
        a plurality of pixel units, each of the pixel units comprising:
            a plurality of first electrodes, disposed on the first transparent substrate and corresponding to a first sub-pixel region and a second sub-pixel region, wherein each of the first electrodes has a first opening corresponding to the first sub-pixel region and the second sub-pixel region, respectively;
            at least one second electrode, disposed on the second transparent substrate and corresponding to the first sub-pixel region and the second sub-pixel region;
            a liquid layer, disposed between the first electrodes and the at least one second electrode, wherein the liquid layer is grounded;
            a first optical color-converting liquid layer, disposed on the first electrode and corresponding to the first sub-pixel region for providing a first color light in the first sub-pixel region;
            a second optical color-converting liquid layer, disposed on the first electrode and corresponding to the second sub-pixel region for providing a second color light in the second sub-pixel region;
            a plurality of light-shielding liquid layers, disposed between the at least one second electrode and the liquid layer, wherein the light-shielding liquid layers correspond to the first sub-pixel region and the second sub-pixel region, respectively, for controlling transmittances of the first sub-pixel region and the second sub-pixel region, respectively; and
            a plurality of shielding patterns corresponding to the first opening of each of the first electrodes, respectively; and
    a light-emitting unit, for providing a light source to the electrowetting display panel.

2. The switchable transparent electrowetting display device of claim 1, wherein the light source provided by the light-emitting unit is a near ultraviolet light source, and the first optical color-converting liquid layer and the second optical color-converting liquid layer are a yellow optical color-converting liquid layer and a blue optical color-converting liquid layer, respectively, for converting the near ultraviolet light source into a yellow light and a blue light, respectively.

3. The switchable transparent electrowetting display device of claim 2, wherein the yellow optical color-converting liquid layer and the blue optical color-converting liquid layer comprise a yellow fluorescent layer and a blue fluorescent layer, respectively.

4. The switchable transparent electrowetting display device of claim 2, wherein the yellow optical color-converting liquid layer and the blue optical color-converting liquid layer comprise yellow colloidal quantum dots and blue colloidal quantum dots, respectively.

5. The switchable transparent electrowetting display device of claim 1, wherein each of the first electrodes and the at least one second electrode comprise a transparent electrode, respectively, the at least one second electrode has a plurality of second openings corresponding to the first sub-pixel region and the second sub-pixel region, respectively.

6. The switchable transparent electrowetting display device of claim 5, wherein in a transparent display mode, each of the light-shielding liquid layers are corresponding to each of the second openings of the at least one second electrode, respectively, and in a non-transparent display mode, each of the light-shielding liquid layers are corresponding to the first sub-pixel region and the second sub-pixel region, respectively.

7. The switchable transparent electrowetting display device of claim 5, wherein in a display mode, at least a portion of the first optical color-converting liquid layer or at least a portion of the second optical color-converting liquid layer is corresponding to the first electrode.

8. The switchable transparent electrowetting display device of claim 5, wherein in a non-display mode, the first optical color-converting liquid layer and the second optical color-converting liquid layer are corresponding to the first opening of each of the first electrodes, respectively.

9. The switchable transparent electrowetting display device of claim 1, wherein the liquid layer is a hydrophilic liquid layer, and the light-shielding liquid layer, the first optical color-converting liquid layer and the second optical color-converting liquid layer are hydrophobic liquid layers.

10. The switchable transparent electrowetting display device of claim 1, wherein the electrowetting display panel further comprises a first hydrophobic dielectric layer disposed on the first electrodes, and a second hydrophobic dielectric layer disposed on the at least one second electrode.

11. The switchable transparent electrowetting display device of claim 1, wherein the electrowetting display panel further comprises a plurality of first partitions disposed on the first transparent substrate and a plurality of second partitions disposed on the second transparent substrate, each of the first partitions surrounds the first sub-pixel region and the second sub-pixel region, and each of the second partitions surrounds the first sub-pixel region and the second sub-pixel region.

12. The switchable transparent electrowetting display device of claim 1, wherein a portion of the first electrodes further corresponds to a third sub-pixel region; a portion of the at least one second electrode further corresponds to the third sub-pixel region; each of the pixel units further comprises a third optical color-converting liquid layer disposed on the first electrode and corresponding to the third sub-pixel region for providing a third color light; and a portion of the light-shielding liquid layers further corresponds to the third sub-pixel region for controlling a transmittance of the third sub-pixel region.

13. The switchable transparent electrowetting display device of claim 12, wherein the light source provided by the light-emitting unit is a near ultraviolet light source, and the first optical color-converting liquid layer, the second optical color-converting liquid layer and the third optical color-converting liquid layer are a red optical color-converting liquid layer, a green optical color-converting liquid layer and a blue optical color-converting liquid layer, respectively, for converting the near ultraviolet light source into a red light, a green light and a blue light, respectively.

14. The switchable transparent electrowetting display device of claim 13, wherein the red optical color-converting liquid layer, the green optical color-converting liquid layer and the blue optical color-converting liquid layer comprise a red fluorescent layer, a green fluorescent layer and a blue fluorescent layer, respectively.

15. The switchable transparent electrowetting display device of claim 13, wherein the red optical color-converting liquid layer, the green optical color-converting liquid layer and the blue optical color-converting liquid layer comprise red colloidal quantum dots, green colloidal quantum dots and blue colloidal quantum dots, respectively.

16. The switchable transparent electrowetting display device of claim 12, wherein each of the first electrodes and the at least one second electrode comprise a transparent electrode, respectively, the first opening of the first electrode is further corresponding to the third sub-pixel region, the at least one second electrode has a plurality of second openings corresponding to the first sub-pixel region, the second sub-pixel region and the third sub-pixel region, respectively.

17. The switchable transparent electrowetting display device of claim 16, wherein in a transparent display mode, each of the light-shielding liquid layers are corresponding to each of the second openings of the at least one second electrode, respectively, and in a non-transparent display mode, the light-shielding liquid layers are corresponding to the first sub-pixel region, the second sub-pixel region and the third sub-pixel region, respectively.

18. The switchable transparent electrowetting display device of claim 16, wherein in a display mode, at least a portion of the first optical color-converting liquid layer, at least a portion of the second optical color-converting liquid layer or at least a portion of the third optical color-converting liquid layer is corresponding to the first electrode.

19. The switchable transparent electrowetting display device of claim 16, wherein in a non-display mode, the first optical color-converting liquid layer, the second optical color-converting liquid layer and the third optical color-converting liquid layer are corresponding to the first opening of each of the first electrodes, respectively.

20. The switchable transparent electrowetting display device of claim 12, wherein the liquid layer is a hydrophilic liquid layer, and the light-shielding liquid layer, the first optical color-converting liquid layer, the second optical color-converting liquid layer and the third optical color-converting liquid layer are hydrophobic liquid layers, respectively.

21. The switchable transparent electrowetting display device of claim 12, wherein the electrowetting display panel further comprises a first hydrophobic dielectric layer disposed on the first electrodes, and a second hydrophobic dielectric layer disposed on the at least one second electrode.

22. The switchable transparent electrowetting display device of claim 12, wherein the electrowetting display panel further comprises a plurality of first partitions disposed on the first transparent substrate and a plurality of second partitions disposed on the second transparent substrate, each of the first partitions surrounds the first sub-pixel region, the second sub-pixel region and the third sub-pixel region, and each of the second partitions surrounds the first sub-pixel region, the second sub-pixel region and the third sub-pixel region.

23. The switchable transparent electrowetting display device of claim 1, wherein the first electrodes are driven actively.

24. The switchable transparent electrowetting display device of claim 1, wherein the at least one second electrode is driven passively.

25. The switchable transparent electrowetting display device of claim 1, wherein the first transparent substrate is a light guide plate, and the light-emitting unit comprises at least one light-emitting device disposed on at least one side of the first transparent substrate.

26. The switchable transparent electrowetting display device of claim 1, further comprising a light guide plate disposed on a side of the first transparent substrate opposite to the second transparent substrate, wherein the light-emitting unit comprises at least one light-emitting device disposed on at least one side of the light guide plate.

* * * * *